United States Patent
Akkaya et al.

(10) Patent No.: US 10,747,309 B2
(45) Date of Patent: Aug. 18, 2020

(54) RECONFIGURABLE OPTICS FOR SWITCHING BETWEEN NEAR-TO-EYE DISPLAY MODES

(71) Applicant: Microsoft Technology Licensing, LLC, Redmond, WA (US)

(72) Inventors: Onur Can Akkaya, Palo Alto, CA (US); Bernard C. Kress, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/976,667

(22) Filed: May 10, 2018

(65) Prior Publication Data
US 2019/0346918 A1   Nov. 14, 2019

(51) Int. Cl.
G06F 3/01 (2006.01)
G02B 27/01 (2006.01)
G02B 27/00 (2006.01)

(52) U.S. Cl.
CPC .......... *G06F 3/013* (2013.01); *G02B 27/0075* (2013.01); *G02B 27/0172* (2013.01)

(58) Field of Classification Search
CPC .. G06F 3/013; G02B 27/0172; G02B 27/0075
See application file for complete search history.

(56) References Cited

U.S. PATENT DOCUMENTS

| | | | |
|---|---|---|---|
| 8,780,014 B2 | 7/2014 | Border et al. | |
| 9,223,138 B2 * | 12/2015 | Bohn | G02B 27/0172 |
| 9,626,936 B2 | 4/2017 | Bell | |
| 9,779,643 B2 * | 10/2017 | Bohn | G09G 3/001 |
| 9,798,146 B2 * | 10/2017 | Yang | G02B 27/0172 |
| 10,248,001 B1 * | 4/2019 | Lu | G02F 1/29 |
| 10,310,598 B2 * | 6/2019 | Trail | G06F 3/013 |
| 2003/0197933 A1 * | 10/2003 | Sudo | H04N 13/211 359/464 |
| 2010/0141905 A1 * | 6/2010 | Burke | G02B 27/017 353/85 |
| 2010/0231783 A1 * | 9/2010 | Bueler | G02B 3/14 348/347 |
| 2012/0113092 A1 * | 5/2012 | Bar-Zeev | G02B 27/017 345/419 |

(Continued)

OTHER PUBLICATIONS

"Near-eye displays", Retrieved From https://www.lighttrans.com/applications/virtual-mixed-reality/near-eye-displays.html, Retrieved on: Apr. 5, 2018, 5 pages.

(Continued)

*Primary Examiner* — Benyam Ketema
(74) *Attorney, Agent, or Firm* — Holzer Patel Drennan

(57) ABSTRACT

A system including reconfigurable optics for switching between different near-to-eye display modes includes a waveguide combiner and multiple focus-tunable lenses including an eye-side focus-tunable lens and a world-side focus-tunable lens positioned on opposite sides of the waveguide combiner. The waveguide combiner is positioned to receive light from an optical projection source and to direct the light through the eye-side focus-tunable lens, and the system further includes a microdisplay positioned to transmit light along an optical path sequentially through the world-side focus-tunable lens and the eye-side focus-tunable lens.

20 Claims, 7 Drawing Sheets

(56) References Cited

U.S. PATENT DOCUMENTS

| | | | |
|---|---|---|---|
| 2012/0127062 A1 | 5/2012 | Bar-Zeev et al. | |
| 2012/0235885 A1* | 9/2012 | Miller | G02B 27/0093 345/8 |
| 2013/0050070 A1* | 2/2013 | Lewis | A61B 3/113 345/156 |
| 2013/0147851 A1* | 6/2013 | Yim | H01L 27/3232 345/690 |
| 2013/0322810 A1* | 12/2013 | Robbins | G02B 5/30 385/11 |
| 2014/0140654 A1* | 5/2014 | Brown | G02F 1/29 385/10 |
| 2014/0153102 A1* | 6/2014 | Chang | G02B 27/0172 359/630 |
| 2014/0340424 A1 | 11/2014 | Ellsworth | |
| 2014/0364212 A1 | 12/2014 | Osman et al. | |
| 2015/0002940 A1* | 1/2015 | Nister | G02B 27/0172 359/630 |
| 2015/0153572 A1* | 6/2015 | Miao | G02B 27/017 345/8 |
| 2015/0205126 A1* | 7/2015 | Schowengerdt | G06T 13/40 345/633 |
| 2015/0235431 A1* | 8/2015 | Schowengerdt | G06T 13/40 345/633 |
| 2015/0253573 A1* | 9/2015 | Sako | G02B 27/0172 345/156 |
| 2016/0025978 A1 | 1/2016 | Mallinson | |
| 2017/0045746 A1 | 2/2017 | Ellsworth et al. | |
| 2017/0161951 A1* | 6/2017 | Fix | G09G 5/00 |
| 2017/0219827 A1* | 8/2017 | Pan | G02B 27/0172 |
| 2017/0293145 A1 | 10/2017 | Miller et al. | |
| 2018/0048882 A1 | 2/2018 | Eash et al. | |
| 2018/0052326 A1 | 2/2018 | Wall et al. | |
| 2018/0239145 A1* | 8/2018 | Lanman | G02B 27/0172 |
| 2018/0275394 A1* | 9/2018 | Yeoh | G02B 3/14 |

OTHER PUBLICATIONS

Dunn, et al., "Wide Field of View Varifocal Near-Eye Display Using See-Through Deformable Membrane Mirrors", In Journal of IEEE Transactions on Visualization and Computer Graphics, vol. 23, Issue 4, Apr. 2017, pp. 1275-1284.

"International Search Report and Written Opinion Issued in PCT Application No. PCT/US19/029534", dated Aug. 5, 2019, 12 Pages.

* cited by examiner

RECONFIGURABLE OPTICS FOR SWITCHING BETWEEN NEAR-TO-EYE DISPLAY MODES

BACKGROUND

Augmented reality (AR) technology allows virtual imagery to be mixed with a real world physical environment. Typically, AR headsets include see-through near-to-eye displays (NED) that are worn by users to view the mixed imagery of virtual and real-world objects. In contrast, virtual reality (VR) headsets are designed to immerse the user in a virtual experience. Virtual reality headsets typically include NEDs with opaque backdrops, blocking the user's view of the real world. Experiences enabled by these two types of displays differ due to fundamental differences in their optical designs.

SUMMARY

Implementations disclosed herein provide reconfigurable optics for switching between different near-to-eye display modes. According to one implementation, a system includes a waveguide combiner in addition to an eye-side lens and a world-side lens positioned on opposite sides of the waveguide combiner. The waveguide combiner is positioned to receive light from an optical projection source and to direct the light through the eye-side lens. The system further includes a microdisplay positioned to transmit light along an optical path sequentially through the world-side lens and the eye-side lens.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The herein disclosed technology provides reconfigurable optics for mixed reality (MR) systems. As used herein, the term "MR system" refers to a system that can be potentially used in separate, selectable augmented reality (AR) and virtual reality (VR) near-to-eye display modes. According to one implementation, the disclosed reconfigurable optics provide a selectable AR experience including a see-through AR display that is varifocal over a small field-of-view while providing a separately selectable VR experience including a non-foveated opaque VR display. Depending on system design, the optics of the separate VR and AR systems may be controlled simultaneously in a manner that provides a third selectable near-to-eye display mode including a foveated opaque VR display. These and other implementations are discussed below with reference to the following figures.

Figure 1:
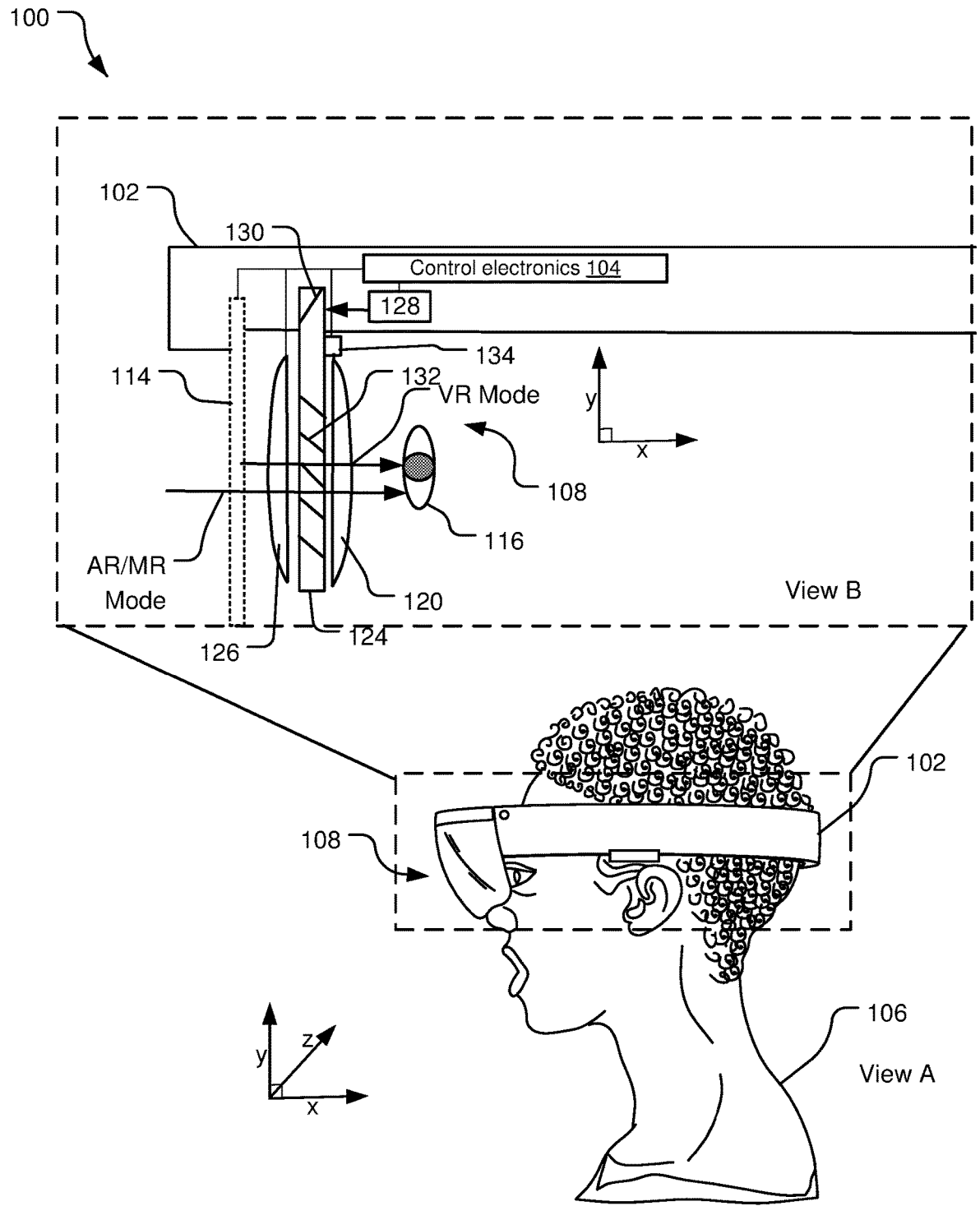
FIG. 1 illustrates an example head-mounted display (HMD) device including reconfigurable optics for switching between multiple near-to-eye display modes.

FIG. 1 illustrates an example head-mounted display (HMD) device 100 including reconfigurable optics 108 for switching between multiple near-to-eye display modes. As shown in View A, the HMD device 100 includes a frame 102 including a wearable headband. The frame 102 supports the reconfigurable optics 108 as well as control electronics 104 including driving circuitry, processing units, and memory that stores processor-executable instructions for controlling image projection and various settings of the reconfigurable optics 108 to provide a wearer 106 with different, selectable near-to-eye display mode experiences.

According to one implementation, the reconfigurable optics 108 are integrated in an MR system that facilitates selective switching between separate VR and AR display modes or merging of VR and AR modes. View B of FIG. 1 illustrates a cross-sectional schematic view of an interior of the HMD device 100 and various optical components that provide the multiple near-to-eye display modes. Since this cross-sectional view is taken lengthwise (e.g., along the X-Y plane of the page), it may be understood that this cross-section represents the optical elements delivering line-of-sight imagery to a first eye of the wearer 106 (e.g., an eye 116) but that some or all of the optical elements shown may be duplicated in the z-plane behind those shown so as to provide identical experiences for the wearer's second eye.

The HMD device 100 includes at least a pair of focus-tunable lenses (e.g., first focus-tunable lens 120 and a second focus-tunable lens 126) positioned on opposite sides of waveguide combiner 124. The waveguide combiner 124 is transparent to light traveling along a line of sight of the wearer 106 such that the wearer 106 can see real-world surroundings when looking through the combination of the waveguide combiner 124 and the focus-tunable lenses 120 and 126.

In addition to the waveguide combiner 124 and the focus-tunable lenses 120 and 126, the HMD device 100 includes two different light projection sources. An optical projection source 128 projects light that provides virtual imagery in the AR mode. In contrast, a microdisplay 114 projects light that provides virtual imagery of the VR mode. In FIG. 1, the microdisplay 114 is shown in dotted lines to indicate that this element is, in some implementations, removably attachable to the frame 102.

When the HMD device 100 is utilized in the AR mode, the micro-display 114 is transparent along the natural line of sight of the wearer 106 or else decoupled entirely from the frame 102 (and absent from the natural line of sight). Light is projected from the optical projection source 128 and coupled into the waveguide combiner 124 by way of reflection off a first reflecting surface 130. The reflected light propagates through the waveguide combiner 124 via total internal reflection and, after several reflections off interior surfaces of the waveguide combiner 124, the light waves reach an array of selectively reflecting surfaces (e.g., a reflecting surface 132) that couple the incident light back out of the waveguide combiner 124 and through the second focus-tunable lens 126 to the eye 116 of the wearer 106. In another implementation, Holographic Optical Elements (HOEs) couple the light waves into and out of the waveguide combiner 124. In still another implementation, HOEs expand the exit pupil to create an eye-box over which the wearer 106 sees the virtual image.

During use in the AR mode, an optical power controller (not shown) of the control electronics 104 selectively varies optical power of the focus-tunable lenses 120 and 126. In one implementation, the optical power controller varies the focal plane of virtual images to match vergence cues of the wearer 106 detected by an eye-tracking assembly 134. As used herein, "vergence cues" refer to the relative movement of the pupils of the wearer 106 toward and away from one another. The eye-tracking assembly 134 obtains images of the eye 116 and uses computer vision techniques to determine the location of the pupil within the eye socket. For example, the eye-tracking assembly 134 may include an eye-tracking illumination device (e.g., one or more infrared IR emitters, which emit IR light toward the eye 116) and one or more cameras that sense the light emitted by the eye-tracking illumination device and reflected off the eye 116. In one implementation, the eye-tracking assembly 134 tracks movement of a single eye. In another implementation, the eye-tracking assembly 134 tracks both eyes separately.

In everyday life, vergence cues tell the brain where an object in 3D space is located and thus, how to adjust the focal length of the lens in each eye. In the HMD device 100, the eye-tracking assembly 134 provides a similar function by detecting vergence cues, and the optical power controller uses those cues to identify a corresponding depth of a focal plane. The optical power controller sets the focal length of the first focus-tunable lens 120 to create a virtual image of the projected light at the identified depth. This, in effect, facilitates consistency between the accommodation cue and the vergence cue.

Although light from the optical projection source 128 does not traverse through the second focus-tunable lens 126, the wearer 106 peers out through the combination of the second focus-tunable lens 126, the waveguide combiner 124 (which appears transparent), and the first focus-tunable lens 120 when viewing the virtual imagery imaged by the first focus-tunable lens 120 against real-world surroundings. To provide an undistorted, non-magnified see-through scene including physical real-world objects, the optical power controller sets focal power of the second focus-tunable lens 126 to compensate for the focal power of the first focus-tunable lens 120. In some implementations, the optical power controller controls the focal power such that the sum of the focal power of the first focus-tunable lens 120 and the second focus-tunable lens 126 is zero during use of the HMD device 100 in the AR mode. In other implementations, this focal power sum may be controlled to provide a non-zero magnification selected to correct a visual impairment of the wearer 106, such as to correct for far-sightedness, near-sightedness, or an astigmatism. For example, the first focus-tunable lens 120 has a negative optical power and the second focus-tunable lens 126 has a positive optical power of approximately equal magnitude.

When the HMD device 100 is utilized in the VR mode, the microdisplay 114 is used as a projection source in lieu of the optical projection source 128. As mentioned above, the microdisplay 114 is, in some implementations, removably attachable to the frame 102. For example, the microdisplay 114 may be a mobile device display (e.g., a mobile phone) that the wearer 106 couples to the frame 102 when using the HMD device 100 in the VR mode and removes from the frame 102 when using the HMD device 100 in the AR mode. In other implementations, the microdisplay 114 is non-removably attached to the frame 102. For example, the microdisplay 114 may be a transparent display, such as an OLED display on glass, through which the wearer 106 views the world when the HMD device 100 is functioning in the AR mode.

When the HMD device 100 is operated in the VR mode, the microdisplay 114 and/or device housing (not shown) provides an opaque backdrop preventing the wearer 106 from seeing real-world objects through the microdisplay 114. If the microdisplay 114 is transparent in other display modes, this opacity effect may be achieved in various ways. In one implementation, the microdisplay includes a dimmable back panel that is electro chromatically controlled by the control electronics 104 to provide a dark, opaque backdrop for VR imagery presented on the microdisplay 114.

Notably, light emitted from the microdisplay 114 travels through each of the focus-tunable lenses 120 and 126 as well as through the waveguide combiner 124 when in route to the wearer's eye 116. In the VR mode, the optical power controller controls optical power of the pair of the focus tunable lenses 120 and 126 to collectively form a magnifying lens (e.g., each lens having a positive power) for the light emitted by the microdisplay 114. The microdisplay 114 is positioned within the focal length of the magnifying lens such that a magnified virtual image of the microdisplay 114 is imaged by the eye 116. In this configuration, the position and magnification of the virtual image are determined by the focal length of the magnifying lens and the separation of the microdisplay 114 from the second focus-tunable lens 126.

In one implementation, the wearer 106 provides an instruction (e.g., touch or voice input) to switch the HMD device 100 from the AR display mode to the VR display mode. Responsive to the instruction, the optical power controller alters the optical power of the focus-tunable lenses 120, 126 to create a magnifying lens with a short focal length (e.g. a biconvex lens) to magnify images presented by the microdisplay 114. The control electronics 104 execute instructions to begin presenting imagery on the microdisplay 114. If the microdisplay 114 is not permanently attached to the frame 102, the wearer 106 may first selectively couple the microdisplay 114 to the frame 102 to ready the HMD device 100 for operation in the VR mode. Attaching the microdisplay 114 may, for example, entail positioning the microdisplay 114 so as to electrically couple with leads integrated into the frame 102 that supply electrical connections to driving circuitry, processing units, sensors, power supply, etc. of the HMD device 100. In other implementations, the microdisplay 114 communicates wirelessly with the control electronics 104 of the HMD device 100.

Similar to the vergence-accommodation cue matching in the AR mode, the optical power controller may selectively vary optical power to the focus-tunable lenses 120, 126 when operating in the VR mode to set the focal length of the magnifying lens to match vergence cues detected by the eye tracker assembly 134. Varying the focal length of the magnifying lens in this way effectively changes the distance to the magnified virtual image to match the user's gaze upon various objects in the virtual world. Notably, however, variations in the focal length of the magnifying lens to match vergence cues may affect a corresponding change in magnification of the magnified virtual image. Accordingly, some implementations of the HMD device 100 are adapted to continuously control and/or vary a size of the imagery as presented on the microdisplay 114 to ensure consistency in the size of the magnified virtual image as the wearer alters his or her gaze upon different objects presented in the virtual world.

Figure 2:
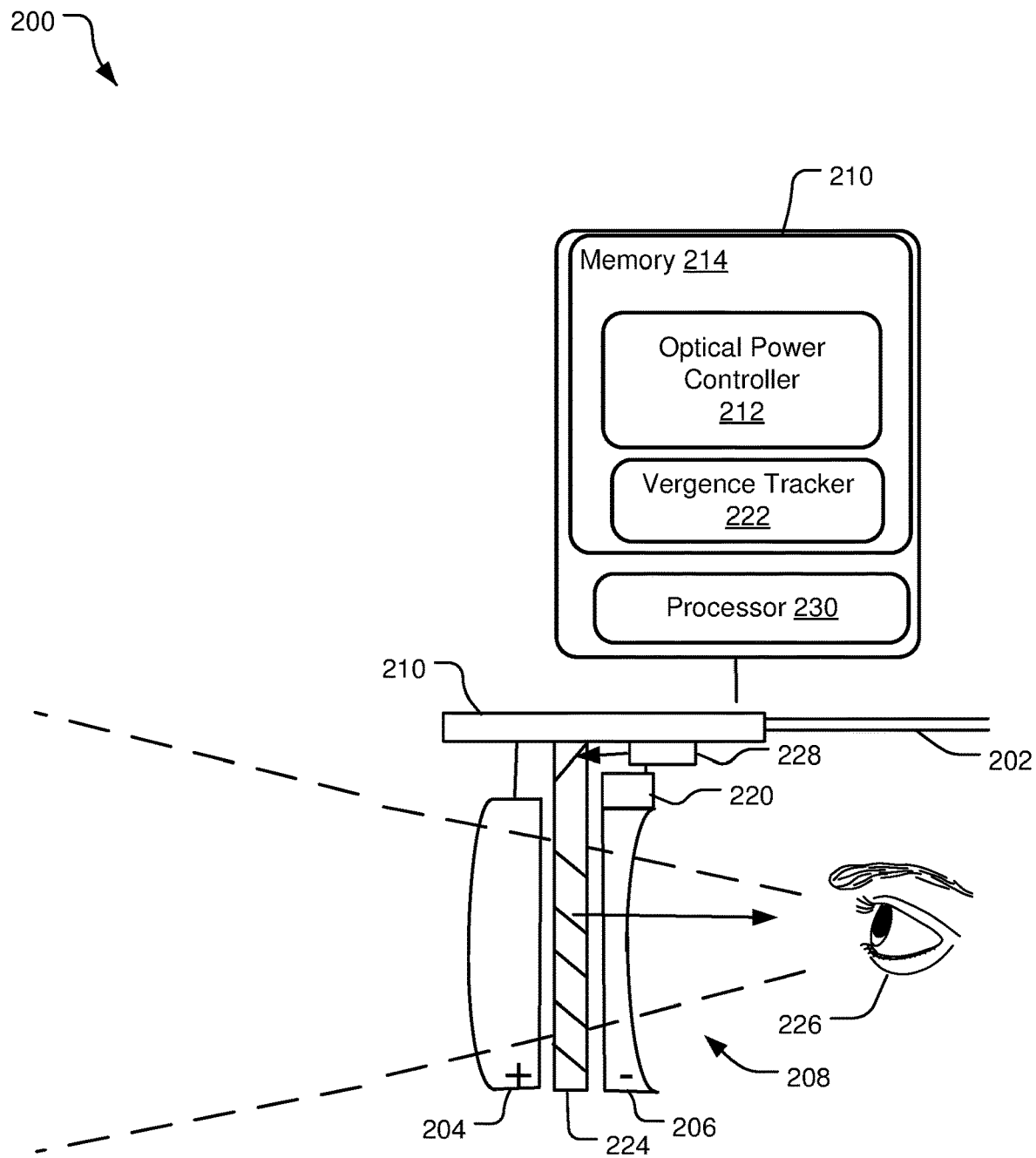
FIG. 2 illustrates a portion of another example HMD device including reconfigurable optics for switching between multiple near-to-eye display modes.

FIG. 2 illustrates a portion of another example HMD device 200 including reconfigurable optics 208 for switching between multiple near-to-eye display modes. The HMD device 200 includes a frame 202 that includes and supports control electronics 210, the reconfigurable optics 208, an eye-tracking assembly 220, an optical projection source 228. In the illustrated implementation, the reconfigurable optics 208 are configured for use in an AR mode.

The reconfigurable optics 208 include at least a pair of focus-tunable lenses positioned on opposite sides of a waveguide combiner 224. The pair of focus-tunable lenses includes an eye-side focus-tunable lens 206 and a world-side focus-tunable lens 204. As used herein, the terms "eye-side" and "world-side" are used consistently with their ordinary meaning in that an "eye-side lens" refers to a lens that is more proximal to a user's eye 226 (e.g., between the eye 226 and the waveguide combiner 224), while the term "world-side lens" refers to a lens that is more proximal to the surrounding environment (e.g., separated from the eye 226 by the waveguide combiner 224).

The control electronics 210 of the HMD device 200 include at least a processor 230 (which may include one or multiple processing units) and memory 214 storing an optical power controller 212 and a vergence tracker 222. During operation of the HMD device 200, the optical power controller 212 controllably varies optical power of the world-side focus-tunable lens 204 and the eye-side focus-tunable lens 206.

In the illustrated implementation, the optical power controller 212 controls the reconfigurable optics 208 to provide the user with an augmented reality (AR) experience. Light emitted by the optical projection source 228 is coupled into the waveguide combiner 224, channeled to an output coupling of the waveguide combiner 224, and directed through the eye-side focus-tunable lens 206 and toward the user's eye 226.

Specifically, the optical power controller 212 controls the optical power of the eye-side focus-tunable lens 206 to match vergence cues determined by the vergence tracker 222. For example, the vergence tracker 222 processes imagery of the eye 226 (or of both eyes) that is captured by an eye-tracking assembly 220 to determine the vergence (e.g., convergence or divergence) of the user's eyes. The optical power controller 212 receives a vergence cue from the vergence tracker 222 and controls the optical power of the eye-side focus-tunable lens 206 to image the received light at a focal length corresponding to the received vergence cue.

While controlling the optical power of the eye-side focus-tunable lens 206, as described above, the optical power controller 212 simultaneously controls optical power of the world-side focus-tunable lens 204 to compensate for the optical power of the eye-side focus-tunable lens 206, giving the eye 226 an undistorted, non-magnified see-through scene including real-world surroundings along a natural line-of-sight. In this sense, the eye 226 sees virtual images generated by the reconfigurable optics 208 against the backdrop of real-world surroundings.

Figure 3:
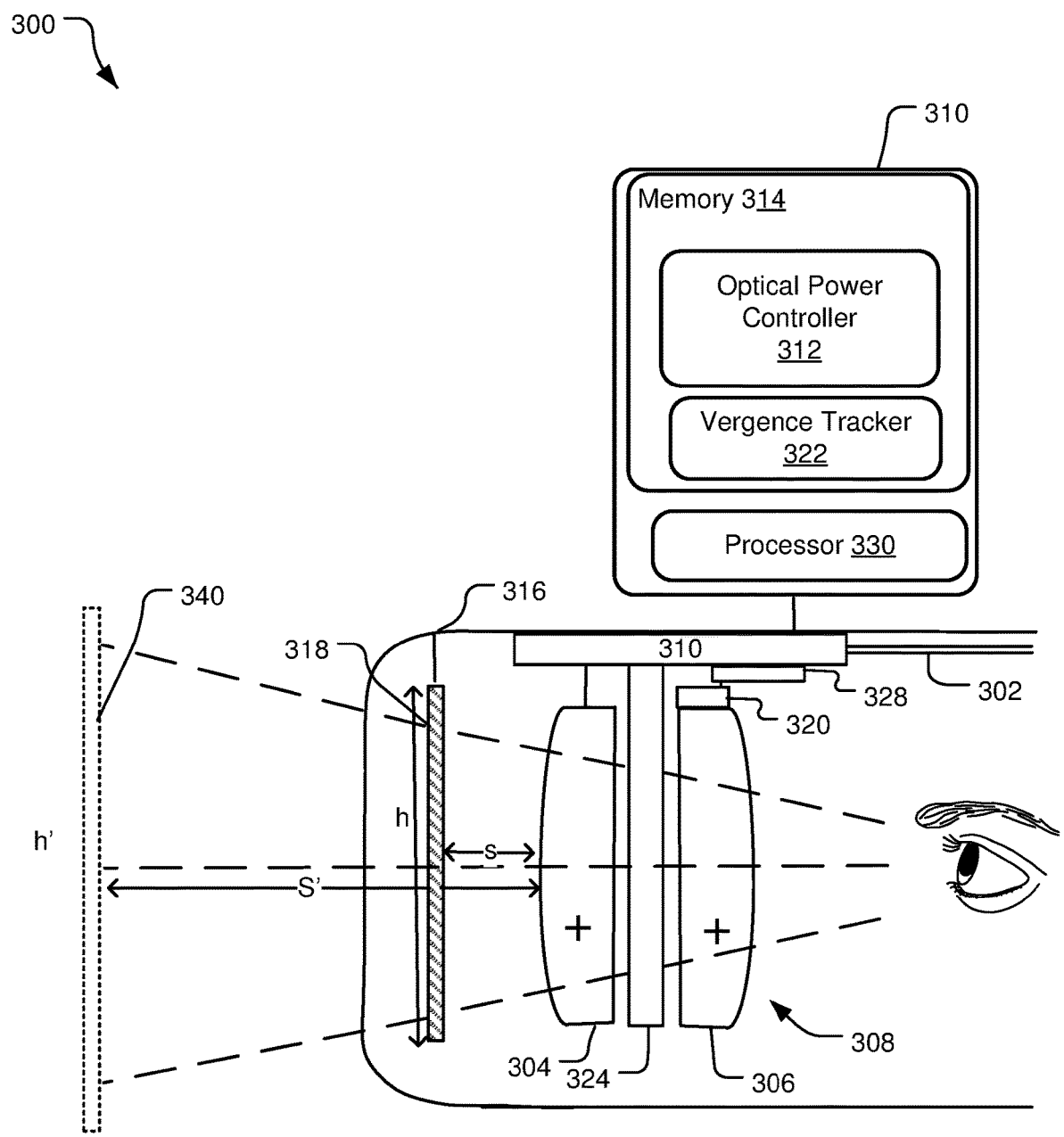
FIG. 3 illustrates yet another example HMD device including reconfigurable optics for switching between near-to-eye display modes.

FIG. 3 illustrates a portion of another example head-mounted display (HMD) device 300 including reconfigurable optics 308 for switching between near-to-eye display modes. The HMD device 300 includes a frame 302 that includes and supports control electronics 310, the reconfigurable optics 308, an eye-tracking assembly 320, an optical projection source 328. The frame 302 is shown encased in a housing 316 including a microdisplay 318.

In FIG. 3, the reconfigurable optics 308 are configured for use in a VR mode. In one implementation, a user selectively couples the housing 316 to the frame 302 when placing the HMD device 300 in the VR mode. In another implementation, the microdisplay 318 is transparent when the HMD device 300 is in other non-VR modes (e.g., the AR mode). In this case, the microdisplay 318 may be permanently attached to the frame 302 and electrically coupled to the control electronics 310. For example, the microdisplay 318 may be an OLED display that is transparent when the device operates in an AR mode and non-transparent (e.g., illuminated) when the HMD device 300 operates in the VR mode. In the AR mode, the HMD device 300 either does not include the housing 316 or the housing is selectably made transparent along the user's line-of-sight. For example, the housing 316 may include a dimmable visor along the user's line-of-sight. Alternatively, the microdisplay 318 may include a dimmable OLED back panel.

The reconfigurable optics 308 include a world-side focus-tunable lens 304 and an eye-side focus-tunable lens 306 on opposite sides of a waveguide combiner 324. The control electronics 310 include a processor 330 and memory 314 storing an optical power controller 312 and a vergence tracker 322. An optical projection source 328 is positioned to project light into the waveguide combiner 324. However, when the HMD device 300 is operated in the VR mode, the optical projection source 328 is not used. Rather, the microdisplay 318 is the source of light that generates the virtual imagery.

During operation of the HMD device 300 in the VR mode, the optical power controller 312 controllably varies optical power of the world-side focus-tunable lens 304 and the eye-side focus-tunable lens 306 to form a magnifying lens with a focal length that is near the plane of the microdisplay 318. In this case, a distance S' to a virtual image 340 is given by equation (1), below:

$$S'=sf/(s-f) \qquad (1)$$

where (s) is the distance between the world-side focus-tunable lens 304 and the microdisplay 318 and (f) is the focal length of the magnifying lens. Here, the magnification (M) of the resulting virtual image 340, represented by the ratio of h'/h in FIG. 3, is given by equation (2) below.

$$M=f/(f-s) \qquad (2)$$

For a virtual image to form, the optical power of the focus-tunable lenses 304, 306 is controlled such that the focal length (f) of the magnifying lens is greater than the distance (s) between the microdisplay 318 and the world-side focus-tunable lens 304. Similar to the AR mode described with respect to FIG. 2, the optical power control 312 may, when operating in the VR mode, selectively vary optical power to the focus-tunable lenses 304, 306 to set the focal length of the magnifying lens to match vergence cues detected by an eye-tracking assembly 320. Varying the focal length of the magnifying lens in this way effectively changes the distance S' to the magnified virtual image 340 to match the user's gaze upon different objects in the virtual world. Notably, however, variations in the focal length of the magnifying lens to match vergence cues may affect a corresponding change in magnification of the magnified virtual image.

In addition to the features described above, the optical power controller 312 may, in some implementations, further control optical power of the world-side focus-tunable lens 304 and the eye-side focus-tunable lens 306 to provide visual correction for a user, which may eliminate the user's need to wear eye glasses or contact lenses while using the HMD device 300.

Figure 4:
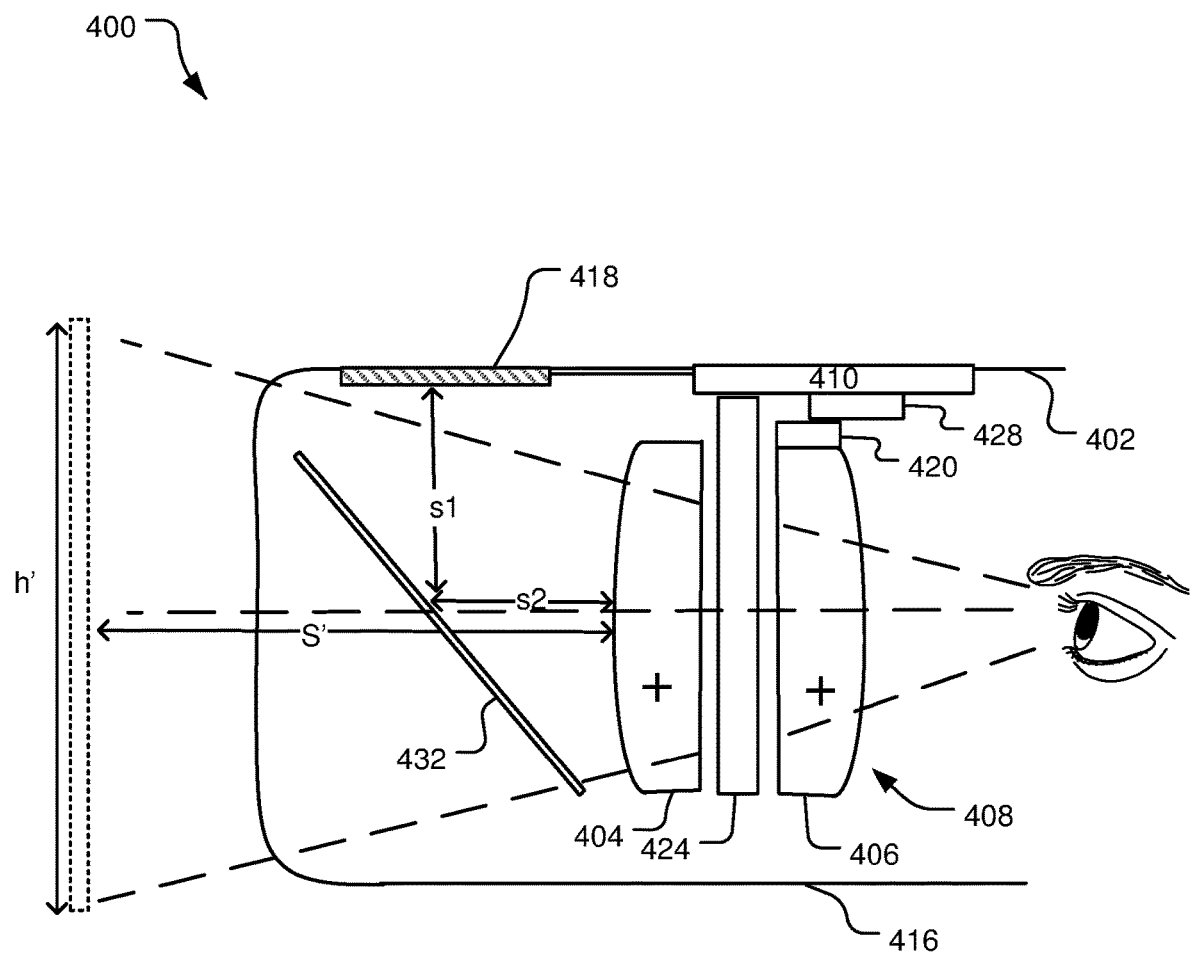
FIG. 4 illustrates still example HMD device including reconfigurable optics for switching between near-to-eye display modes.

FIG. 4 illustrates a portion of another example head-mounted display (HMD) device 400 including reconfigurable optics 408 for switching between near-to-eye display modes. The HMD device 400 includes many of the same components as the HMD device 300 described with respect to FIG. 3 including a housing 416, a frame 402, control electronics 410, an eye-tracking assembly 420, and an optical projection source 428. The reconfigurable optics 408 include at least a pair of focus-tunable lenses 404 and 406 and a waveguide combiner 424 positioned to received light from an optical projection source 428 when operating in an AR mode. The HMD device 400 further includes a microdisplay 418 for use in a VR mode. The microdisplay 418 is shown positioned differently in FIG. 4 than in FIG. 3.

In general, the higher the optical power provided by the magnifying lens (e.g., the focus-tunable lenses 404 and 406), the smaller the HMD device 400 can be. However, the highest possible optical power may be limited by factors such as aperture size of the focus-tunable lenses 404 and 406 and, in liquid lenses, the actuation mechanism and the refractive index of the liquid. In liquid crystal lenses, optical power is limited by birefringence. The illustrated position of the microdisplay 418 in combination with an opaque mirror 432 tilted at 45 degrees with respect to the optical axis (e.g., the direction of s1) allows for a folding of the optical path (s1+s2), permitting a reduction in the x-direction length of the HMD device 400 as compared to implementations that do not fold the optical path. Accordingly, the illustrated implementation allows the HMD device 400 to be manufactured to have a smaller size than the HMD device 300 described with respect to FIG. 3.

Figure 5:
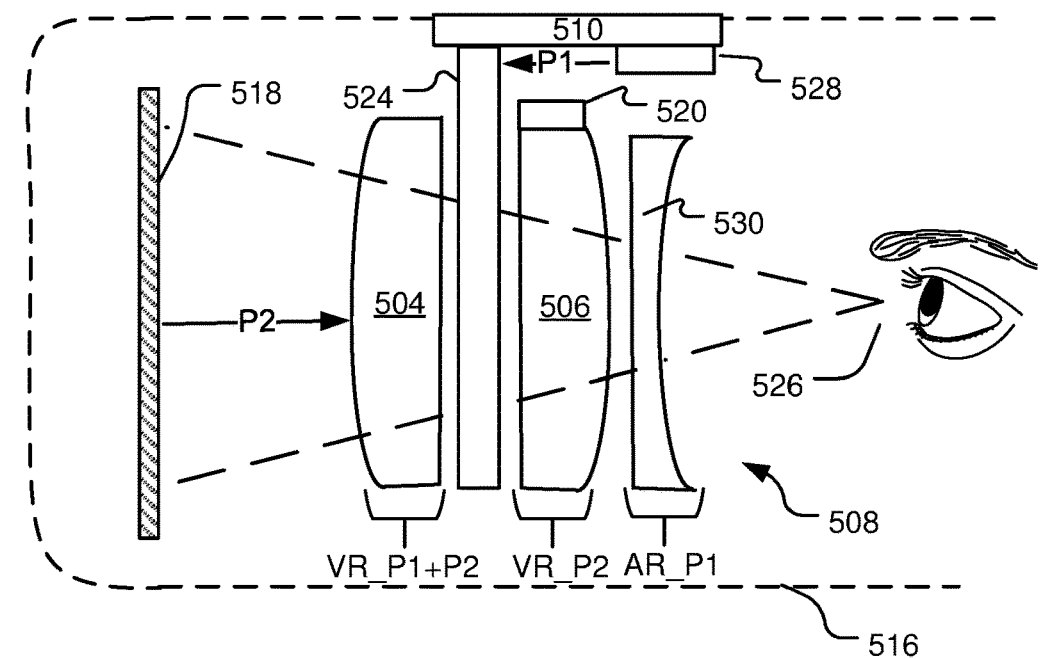
FIG. 5 illustrates yet another example HMD device with reconfigurable optics for switching between near-to-eye display modes.

FIG. 5 illustrates a portion of still another example HMD device 500 including reconfigurable optics 508 for switching between near-to-eye display modes. The reconfigurable optics 508 include a waveguide combiner 524 positioned between a world-side focus-tunable lens 504 and a first eye-side focus-tunable lens 506. A second eye-side focus-tunable lens 530 is further included between the first eye-side focus-tunable lens 506 and a user's eye 526. The HMD device 500 includes an optical power controller (not shown) that selectively and independently controls optical power of each of the three focus-tunable lenses (e.g., 504, 506, and 530). In FIG. 5, the reconfigurable optics 508 are configured to allow selective toggling between three different near-to-eye display modes including: (1) an AR mode with a transparent display; (2) a non-foveated VR mode with an opaque display/backdrop; and (3) a foveated VR mode with an opaque display/backdrop. Each of these separate modes is discussed in turn below.

When operating in the AR mode, the HMD device 500 provides varifocal AR functionality similar to that described above with respect to FIG. 2. In the AR mode, the HMD device 500 projects virtual imagery over a small field-of-view that user views against a backdrop of real-world surroundings. A microdisplay 518 appears transparent to the user and does not emit light in the AR mode. For example, the microdisplay 518 may be a transparent OLED screen. Alternatively, the microdisplay 518 may be removed entirely from the HMD device 500 during device operation in the AR mode. Rather, light for the virtual imagery is emitted by an optical projection source 528 and directed into the waveguide combiner 524. The waveguide combiner 524 outputs the light in the direction of a user's eye 526 along an optical path that passes through the first eye-side focus-tunable lens 506 and the second eye-side focus-tunable lens 530.

Notably, light from the optical projection source 528 has a first polarization (P1) that is different than a second polarization (P2) of light emitted from the microdisplay 518. The first eye-side focus-tunable lens 506 is polarized to affect light of the second polarization (P2). In contrast, the second eye-side focus-tunable lens 530 is polarized to affect light of the first polarization (P1), and the world-side focus-tunable lens 504 has another polarization (P1+P2) so as to affect light of both the first polarization (P1) and the second polarization (P2).

As a result of these polarizations, the light from the optical projection source 528 is unaltered as it passes out of the waveguide combiner 524 and through the first eye-side focus-tunable lens 506 in route to the user's eye 526. The optical power controller actively controls the optical power of the second eye-side focus-tunable lens 530 to match vergence cues determined based on imagery of the user's eye 526, or both eyes, captured by an eye-tracking assembly 520 (e.g., as described above with respect to FIG. 2). To create an undistorted view of real-world surroundings, the optical power controller also controls optical power of the world-side focus-tunable lens 504 to compensate for the optical power of the second focus-tunable eye-side lens 530. In one implementation, the world-side focus-tunable lens 504 is set to have an optical power that compensates for the optical power of the second eye-side focus-tunable lens 530 while the optical power of the first eye-side focus-tunable lens 506 is set to effectively zero with a focal length projected at infinity.

In effect, the combination of focus-tunable lenses 504, 506, and 530 give the eye 526 an undistorted view of real-world surroundings along a natural line-of-sight while virtual imagery is imaged in the foreground. In this sense, the eye 526 sees virtual images generated by the reconfigurable optics 508 against the backdrop of real-world surroundings.

When operating in the non-foveated VR mode, the HMD device 500 provides varifocal VR functionality similar to that described above with respect to FIG. 3. The optical projection source 528 is not used in the non-foveated VR mode. Rather, the microdisplay 518 serves as the virtual imagery light source. In one implementation, the HMD device 500 presents the imagery from the microdisplay 518 against a dark backdrop. For example, the user may selectively couple an opaque housing 516 to the HMD device 500 for use in VR modes or the control electronics 510 may selectively dim a back panel that is integrated within the housing 516 or the microdisplay 518.

During operation in the non-foveated VR mode, the optical power control selectively controls optical power of the world-side focus-tunable lens 504 and the first eye-side focus-tunable lens 506 to form a magnifying lens (not shown). The microdisplay 518 is positioned near the focal length of the resulting magnifying lens. Since the light emitted from the microdisplay 518 panel is polarized according to the second polarization (P2), the emitted light is affected by each of the world-side focus-tunable lens 504 and the first eye-side focus-tunable lens 506 while remaining unaffected by the second eye-side focus-tunable lens 530. The magnifying lens formed by the combination of the world-side focus-tunable lens 504 and the first eye-side focus-tunable lens 506 generates a magnified virtual image of light in a manner similar to that described above with respect to FIG. 3. Also similar to the AR mode described above, the non-foveated VR mode may provide varifocal functionality. For instance, the optical power controller may selectively set the focal length of the magnifying lens (formed by 504 and 506 combined) to match vergence cues detected by an eye-tracking assembly 520.

One of the shortcomings of VR displays that offer a wide field-of-view, such as the display of the non-foveated VR mode described above, is that it is difficult to provide high resolution in the center of the field-of-view, wherein the resolution of the human visual system is the highest (~1 arcminute) without straining processing resources and/or integrating more powerful and costly processing components. To address this shortcoming, the HMD device 500 offers a third selectable mode—a foveated VR mode—that combines imagery projected from both the microdisplay 518 and the optical projection source 528 to deliver high resolution in a center of a user's field of view and lower resolution in the user's periphery where the human visual system has lower resolution.

In the foveated VR mode, the user views imagery against an opaque (e.g., dimmed or darkened) backdrop (not shown) similar to that described above with respect to the non-foveated VR mode. Light from the optical projection source 528 is imaged at a high resolution in the center of the user's field-of-view, while light from the microdisplay 518 is imaged at a lower resolution in the periphery of the user's field-of-view.

More specifically, light from the optical projection source 528 is coupled into the waveguide combiner 524 and output from the waveguide combiner 524 along an optical path toward the eye 526. This light traverses both the first eye-side focus-tunable lens 506 and the second eye-side focus-tunable lens 530. The first eye-side focus-tunable lens 506 has no effect on the light (due to its polarization P1), and the light is instead imaged by the second eye-side focus-tunable lens 530, which is actively controlled to have a focal length matching detected vergence cues.

While the optical power of the second eye-side focus-tunable lens 530 is controlled as described above to generate high-resolution virtual imagery in the center of the user's field-of-view, optical power of the first eye-side focus tunable lens 506 is controlled such that the first eye-side focus tunable lens 506 and the world-side focus-tunable lens 504 form a magnifying lens for light emitted from the microdisplay 518. In one implementation, the magnifying lens is controlled to project the VR imagery from the microdisplay 518 at infinity. When this imagery has a lower resolution than the imagery from the optical projection source 528, the resulting effect is a foveated scene combining imagery of both light sources. Notably, the peripheral imagery (e.g., the background of the VR world) is not varifocal in this case, but this does not affect the user experience since vergence cues typically may not be accommodated for over a large field-of-view.

This foveated VR mode may permit a lower pixel count in the microdisplay 518 (e.g., the VR panel) without a noticeable loss in the perceived resolution since the high-resolution region in the center of the field-of-view is created by the optical projection source 328 with the above-described varifocal optical capability. In one implementation, the center of the microdisplay 518 is turned off when the HMD device 500 is operating in the foveated VR display mode.

Figure 6:
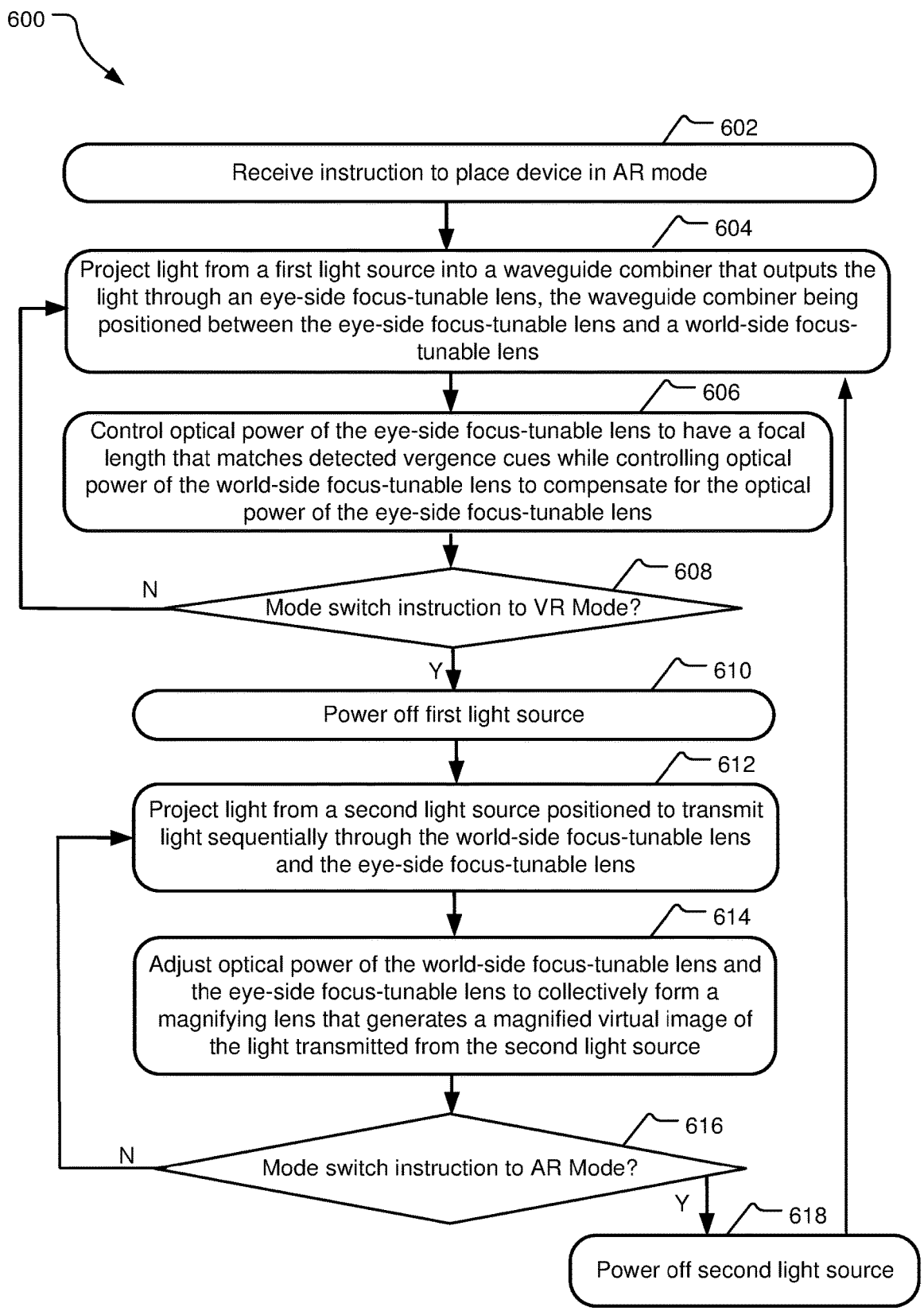
FIG. 6 illustrates example operations for selectively switching between different near-to-eye display modes of an HMD device.

FIG. 6 illustrates example operations 600 for selectively switching between different near-to-eye display modes of an HMD device. A receiving operation 602 receives an instruction to place the HMD device in the AR mode. Responsive to this instruction, a light projection operation 604 projects light from a first light source and the light is coupled into a waveguide combiner positioned between an eye-side focus-tunable lens and a world-side focus tunable lens. The waveguide combiner outputs the light through the eye-side focus-tunable lens and toward a user's eyes. An optical power adjustment operation 606 controllably adjusts optical power of the eye-side focus-tunable lens to have a focal length that matches vergence cues detected from the eyes while also controlling optical power of the world-side focus-tunable lens to compensate for the optical power of the eye-side focus-tunable lens.

While the device is operating in the AR mode as described above, a determination operation 608 actively awaits a mode switch instruction from the AR mode into a VR mode. Responsive to a determination that a mode switch instruction has been received, a powering operation 610 powers off (de-illuminates) the first light source, and another projection operation 612 projects light from a second light source that is positioned to transmit light along an optical path sequentially through the world-side focus-tunable lens and the eye-side focus-tunable lens. In one implementation, the second light source is a microdisplay and the projection operation 612 further entails dimming a back panel of the microdisplay.

Another optical power adjustment operation 614 adjusts optical power of the word-side focus-tunable lens and the eye-side focus-tunable lens to collectively form a magnifying lens that generates a magnified virtual image of light transmitted from the second light source. While the device is operating in the VR mode according to the projection operation 612 and the optical power adjustment operation 614, another determination operation 616 actively awaits a mode switch instruction from the VR mode back into the AR mode. Responsive to a determination that such a mode switch instruction has been received, a powering operation 618 powers off the second light source and the projection operation 604 and the optical power adjustment operation 606 repeat.

In some implementations, the operations 600 provide for selective switching between the AR mode and two different VR modes (e.g., a non-foveated VR mode and a foveated VR mode). In such case, the device configuration and operations may be the same or similar to that described herein with respect to FIG. 5.

Figure 7:
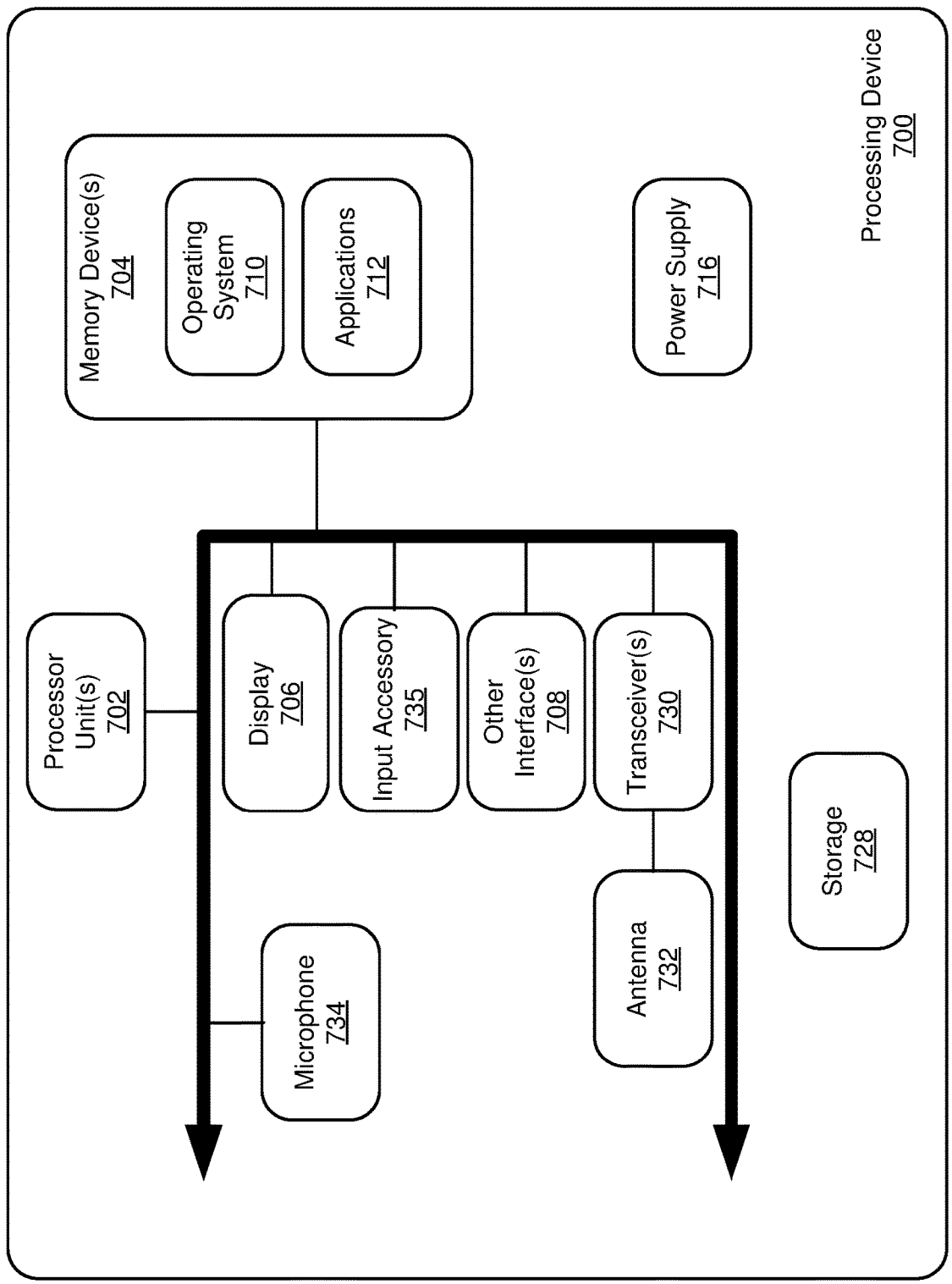
FIG. 7 illustrates an example schematic of a processing device suitable for implementing aspects of the disclosed technology.

FIG. 7 illustrates an example schematic of a processing device 700 suitable for implementing aspects of the disclosed technology. The processing device 700 includes one or more processor unit(s) 702, memory 704, a display 706, and other interfaces 708 (e.g., buttons). The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a gaming device, resides in the memory 704 and is executed by the processor unit(s) 702, although it should be understood that other operating systems may be employed.

One or more applications 712, such as an optical power controller or vergence tracker, are loaded in the memory 704 and executed on the operating system 710 by the processor unit(s) 702. The applications 712 may receive input from various input devices such as a microphone 734 or input accessory 735 (e.g., keypad, mouse, stylus, touchpad, gamepad, racing wheel, joystick). The processing device 700 includes a power supply 716, which is powered by one or more batteries or other power sources and which provides power to other components of the processing device 700. The power supply 716 may also be connected to an external power source that overrides or recharges the built-in batteries or other power sources.

The processing device 700 includes one or more communication transceivers 730 and an antenna 732 to provide network connectivity (e.g., a mobile phone network, Wi-Fi®, Bluetooth®). The processing device 700 may also include various other components, such as a positioning system (e.g., a global positioning satellite transceiver), one or more accelerometers, one or more cameras, an audio interface (e.g., microphone 734, an audio amplifier and speaker and/or audio jack), and storage devices 728. Other configurations may also be employed.

In an example implementation, a mobile operating system, various applications (e.g., an optical power controller or vergence tracker) and other modules and services may have hardware and/or software embodied by instructions stored in memory 704 and/or storage devices 728 and processed by the processor unit(s) 702. The memory 704 may be memory of host device or of an accessory that couples to a host.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media, such as a wired network or direct-wired connection, and wireless media such as acoustic, RF, infrared and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a waveguide combiner and multiple focus-tunable lenses including an eye-side focus-tunable lens and a world-side focus-tunable lens positioned on opposite sides of the waveguide combiner. The waveguide combiner is positioned to receive light from an optical projection source and to direct the light through the eye-side focus-tunable lens. The system further includes a microdisplay positioned to transmit light along an optical path sequentially through the world-side focus-tunable lens and the eye-side focus-tunable lens.

In another example system of any preceding system, the system further comprises a controller configured to control optical power for the eye-side focus-tunable lens to match detected vergence cues to image light from the optical projection source while controlling optical power of the world-side focus-tunable lens to compensate for the optical power of the eye-side focus-tunable lens. The controller is also configured to selectively adjust the optical power of the world-side focus-tunable lens and the eye-side focus-tunable lens to collectively form a magnifying lens that generates a magnified virtual image of the light transmitted from the microdisplay.

In another example system of any preceding system, the microdisplay is transparent when the system is operating in an augmented reality mode and the eye-side focus-tunable lens is controlled to image the light from the optical projection source.

Still another example system of any preceding system includes a supportive housing coupled to the waveguide combiner and the multiple focus-tunable lenses. The microdisplay is removably coupled to the supportive housing.

In still another example system of any preceding system, the system further includes a dimmable back panel and the controller is configured to illuminate the microdisplay and dim the dimmable back panel when the system is operating in a virtual reality mode.

In yet another example system of any preceding system, the world-side focus-tunable lens is polarized to affect light from both the microdisplay and the optical projection source while the eye-side focus-tunable lens is polarized to affect light transmitted from the optical projection source while not affecting light transmitted from the microdisplay. The system further comprises a second eye-side focus-tunable lens polarized to affect light transmitted from the microdisplay while not affecting light transmitted from the optical projection source.

In yet another example system of any preceding system, the system includes the controller configured to control optical power of the world-side focus-tunable lens and the second eye-side focus-tunable lens to form a magnifying lens that images light from the microdisplay while simultaneously controlling optical power of the eye-side focus-tunable lens to have a focal length that matches detected vergence cues.

An example device disclosed herein includes a microdisplay, a waveguide combiner, at least two focus-tunable lenses positioned on opposite sides of the waveguide combiner, and the controller. The controller is configured to control optical power for a first one of the focus-tunable lenses to match detected vergence cues while controlling optical power of a second one of the focus tunable lenses to compensate for the optical power of the first one of the focus-tunable lenses. The controller is further configured to selectively adjust optical power of at least two of the focus-tunable lenses to form a magnifying lens, wherein the microdisplay is positioned such that the magnifying lens images light from the microdisplay.

In another example device of any preceding device, the microdisplay is transparent when the device is operating in an augmented reality mode.

In still another example device of any preceding device, the device further comprise a supportive housing coupled to the waveguide combiner and the focus-tunable lenses. The microdisplay is opaque and removably coupled to the supportive housing.

In still another example device of any preceding device, the device further includes a dimmable back panel and the controller is configured to illuminate the microdisplay and dim the dimmable back panel when the device is operating in a virtual reality mode.

In still another example device of any preceding device, the device further comprises a secondary projection source coupled to an input of the waveguide combiner.

In yet another example device of any preceding device, the focus-tunable lenses include (1) a world-side focus-tunable lens on a first side of the waveguide combiner that is polarized to affect light from both the microdisplay and secondary projection source; (2) a first eye-side focus-tunable lens on a second opposite side of the waveguide combiner that is polarized to affect light transmitted from the secondary projection source while not affecting light transmitted from the microdisplay; and (3) a second eye-side focus-tunable lens on the second opposite side of the waveguide combiner that is polarized to affect light transmitted from the microdisplay while not affecting light transmitted from the secondary projection source.

In still another example device of any preceding device, the controller is configured to control optical power of two of the focus-tunable lenses to form a magnifying lens that images light from the microdisplay while simultaneously controlling optical power of another one of the focus-tunable lenses to have a focal length that matches detected vergence cues.

An example method disclosed herein includes projecting light from a first light source into a waveguide combiner positioned between a pair of focus-tunable lenses. The pair of focus-tunable lenses includes an eye-side focus-tunable lens and a world-side focus-tunable lens, the eye-side focus-tunable lens being positioned to receive the light from an output of the waveguide combiner. The method further provides for receiving an instruction to switch between a first near-to-eye display mode and a second near-to-eye display mode and projecting light from a second light source responsive to receipt of the instruction, where the second light source is positioned to transmit light along an optical path sequentially through the world-side focus-tunable lens and the eye-side focus-tunable lens.

Another example method of any preceding method further comprises controlling optical power of the eye-side focus-tunable lens to match detected vergence cues and to image light from the first light source while controlling optical power of the world-side focus-tunable lens to compensate for the optical power of the eye-side focus-tunable lens. The method further comprises selectively adjusting the optical power of the world-side focus-tunable lens and the eye-side focus-tunable lens to collectively form a magnifying lens that generates a magnified virtual image of the light transmitted from the second light source.

In still another example method of any preceding method, the second light source is transparent when the eye-side focus-tunable lens is controlled to image the light from the first light source.

In yet another example method of any preceding method, the waveguide combiner and the pair of focus-tunable lenses are coupled to a supportive housing, and receiving the instruction includes detecting a coupling between the second light source and the supportive housing.

In yet another example method of any preceding method, the method further comprises dimming a back panel to block a line-of-sight responsive to receipt of the instruction.

In still another example method of any preceding method, the method further comprises controlling optical power of the eye-side focus-tunable lens to match detected vergence cues and image light from the first light source while controlling optical power of the world-side focus-tunable lens to compensate for the optical power of the eye-side focus-tunable lens while simultaneously controlling optical power of a second eye-side focus-tunable lens and the world-side focus-tunable lens to collectively form a magnifying lens that generates a magnified virtual image of the light transmitted from the second light source.

An example system disclosed herein includes a means for projecting light from a first light source into a waveguide combiner positioned between a pair of focus-tunable lenses including an eye-side focus-tunable lens and a world-side focus-tunable lens, the eye-side focus-tunable lens being positioned to receive the light from an output of the waveguide combiner. The method further provides a means for receiving an instruction to switch between a first near-to-eye display mode and a second near-to-eye display mode and a means for projecting light from a second light source responsive to receipt of the instruction, where the second light source is positioned to transmit light along an optical path sequentially through the world-side focus-tunable lens and the eye-side focus-tunable lens.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system comprising:
  a waveguide combiner;
  multiple focus-tunable lenses including an eye-side focus-tunable lens and a world-side focus-tunable lens positioned on opposite sides of the waveguide combiner, the waveguide combiner positioned to receive light from an optical projection source and to direct the light through the eye-side focus-tunable lens; and
  a microdisplay positioned to transmit light along an optical path sequentially through the world-side focus-tunable lens and the eye-side focus-tunable lens; and
  a controller that selectively alters optical power of the eye-side focus-tunable lens and the world-side focus-tunable lens to form a magnifying lens that generates a magnified virtual image of the light transmitted from the microdisplay when transitioning the system from an augmented reality mode to a virtual reality mode.

2. The system of claim 1, wherein the controller is further configured to:
  transition the system from the virtual reality mode to the augmented reality mode by control the optical power for the eye-side focus-tunable lens to match detected vergence cues to image light from the optical projection source while controlling optical power of the world-side focus-tunable lens to compensate for the optical power of the eye-side focus-tunable lens.

3. The system of claim 1, wherein the microdisplay is transparent when the system is operating in the augmented reality mode and the eye-side focus-tunable lens is controlled to image the light from the optical projection source.

4. The system of claim 1, further comprising:
  a supportive housing coupled to the waveguide combiner and the multiple focus-tunable lenses, where the microdisplay is removably coupled to the supportive housing.

5. The system of claim 2, wherein the system further includes a dimmable back panel and the controller is configured to illuminate the microdisplay and dim the dimmable back panel when the system is operating in the virtual reality mode.

6. The system of claim 1, wherein the world-side focus-tunable lens is polarized to affect light from both the microdisplay and the optical projection source and the eye-side focus-tunable lens is polarized to affect light transmitted from the optical projection source while not affecting light transmitted from the microdisplay, and wherein the system further comprises:
  a second eye-side focus-tunable lens polarized to affect light transmitted from the microdisplay while not affecting light transmitted from the optical projection source.

7. The system of claim 6, wherein the system further comprises a controller configured to control optical power of the world-side focus-tunable lens and the second eye-side focus-tunable lens to form a magnifying lens that images light from the microdisplay while simultaneously controlling optical power of the eye-side lens to have a focal length that matches detected vergence cues.

8. A device comprising:
  a microdisplay;
  a waveguide combiner;
  at least two focus-tunable lenses positioned on opposite sides of the waveguide combiner; and
  a controller configured to:
    control optical power for a first one of the focus-tunable lenses to match detected vergence cues while controlling optical power of a second one of the focus tunable lenses to compensate for the optical power of the first one of the focus-tunable lenses; and
    selectively adjust optical power of at least two of the focus-tunable lenses to form a magnifying lens, wherein the microdisplay is positioned such that the magnifying lens images light from the microdisplay.

9. The device of claim 8, wherein the microdisplay is transparent when the device is operating in an augmented reality mode.

10. The device of claim 8, wherein the device further comprises:
  a supportive housing coupled to the waveguide combiner and the focus-tunable lenses, where the microdisplay is opaque and removably coupled to the supportive housing.

11. The device of claim 8, wherein the device further includes a dimmable back panel and the controller is configured to illuminate the microdisplay and dim the dimmable back panel when the device is operating in a virtual reality mode.

12. The device of claim 8, further comprising a secondary projection source coupled to an input of the waveguide combiner.

13. The device of claim 8, wherein the focus-tunable lenses include:
  a world-side focus-tunable lens on a first side of the waveguide combiner, the world-side focus-tunable lens being polarized to affect light from both the microdisplay and a secondary projection source;
  a first eye-side focus-tunable lens on a second opposite side of the waveguide combiner, the first eye-side focus-tunable lens being polarized to affect light transmitted from the secondary projection source while not affecting light transmitted from the microdisplay; and
  a second eye-side focus-tunable lens on the second opposite side of the waveguide combiner, the second eye-side focus-tunable lens polarized to affect light transmitted from the microdisplay while not affecting light transmitted from the secondary projection source.

14. The device of claim 8, wherein the controller is further configured to control optical power of two of the focus-tunable lenses to form a magnifying lens that images light from the microdisplay while simultaneously controlling optical power of another one of the focus-tunable lenses to have a focal length that matches detected vergence cues.

15. A method comprising:
  projecting light from a first light source into a waveguide combiner, the waveguide combiner being positioned between a pair of focus-tunable lenses including an eye-side focus-tunable lens and a world-side focus-tunable lens, the eye-side focus-tunable lens being positioned to receive the light from an output of the waveguide combiner;
  receiving an instruction to switch between an augmented reality display mode and a virtual reality display mode; and
  projecting light from a second light source responsive to receipt of the instruction, the second light source positioned to transmit light along an optical path sequentially through the world-side focus-tunable lens and the eye-side focus-tunable lens; and
  transitioning the eye-side focus-tunable lens and the world-side focus-tunable lens from the augmented reality display mode to the virtual reality display mode by selectively altering optical power of the eye-side focus-tunable lens and the world-side focus-tunable lens to form a magnifying lens that generates a magnified virtual image of the light transmitted from the microdisplay.

16. The method of claim 15, further comprising:
transitioning the eye-side focus-tunable lens and the world-side focus-tunable lens from the virtual reality mode to the augmented reality mode by controlling optical power of the eye-side focus-tunable lens to match detected vergence cues and image light from the first light source while controlling optical power of the world-side focus-tunable lens to compensate for the optical power of the eye-side focus-tunable lens.

17. The method of claim 15, wherein the second light source is transparent when the eye-side focus-tunable lens is controlled to image the light from the first light source.

18. The method of claim 15, wherein the waveguide combiner and the pair of focus-tunable lenses are coupled to a supportive housing and receiving the instruction includes detecting a coupling between the second light source and the supportive housing.

19. The method of claim 15, further comprising:
dimming a back panel to block a line-of-sight responsive to receipt of the instruction.

20. The method of claim 15, wherein the method further comprises:
controlling optical power of the eye-side focus-tunable lens to match detected vergence cues and image light from the first light source while controlling optical power of the world-side focus-tunable lens to compensate for the optical power of the eye-side focus-tunable lens; and
simultaneously controlling optical power of a second eye-side focus-tunable lens and the world-side focus-tunable lens to collectively form a magnifying lens that generates a magnified virtual image of the light transmitted from the second light source.

* * * * *